(No Model.)
A. A. BROWN.
MEANS FOR STORING POWER DERIVED FROM AGITATED WATER.
No. 592,762. Patented Nov. 2, 1897.
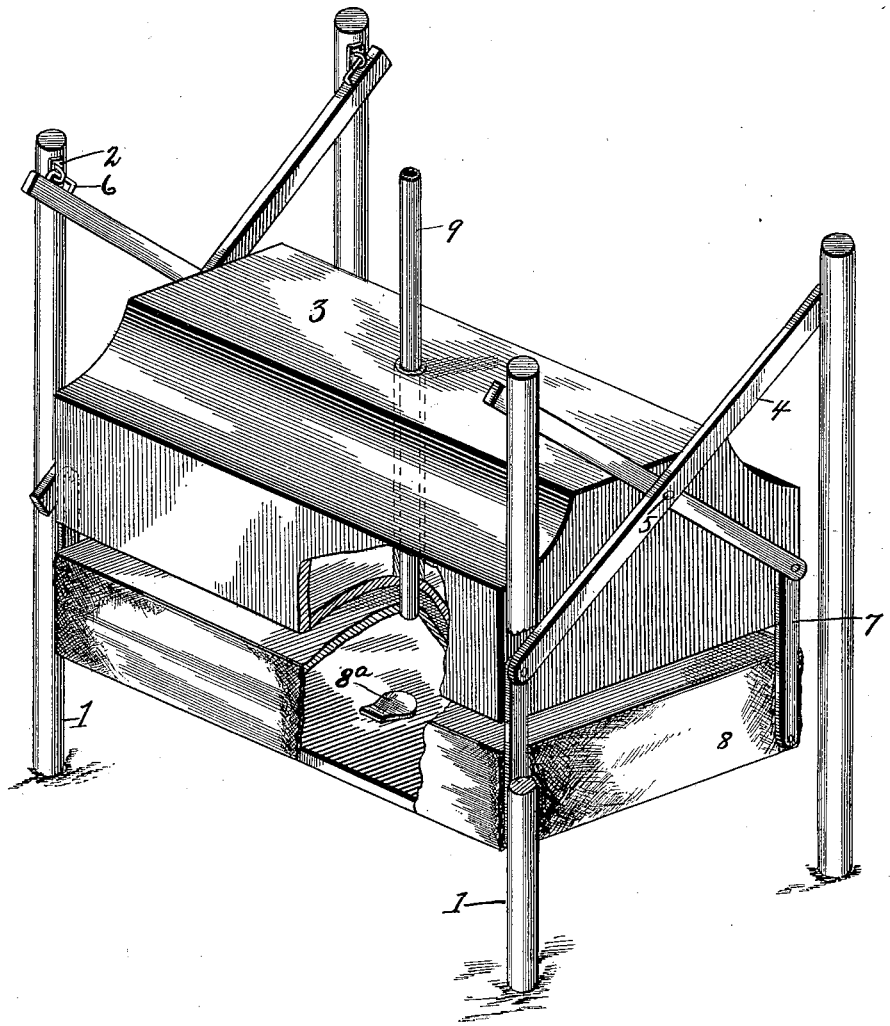

UNITED STATES PATENT OFFICE.

AARON A. BROWN, OF ROLAND PARK, MARYLAND.

MEANS FOR STORING POWER DERIVED FROM AGITATED WATER.

SPECIFICATION forming part of Letters Patent No. 592,762, dated November 2, 1897.

Application filed March 11, 1897. Serial No. 627,036. (No model.)

*To all whom it may concern:*

Be it known that I, AARON A. BROWN, a citizen of the United States of America, residing at Roland Park, in the county of Baltimore and State of Maryland, have invented certain new and useful Improvements in Means for Storing Power Derived from Agitated Water, of which the following is a specification, reference being had therein to the accompanying drawing.

The invention relates to means and apparatus for storing the power derived from agitated water, the object being to provide novel means whereby the waves or swells of water convey to a buoy or float a movement, which movement operates through suitable mechanism to force water, air, or the like to a suitable reservoir or station where it may be utilized.

A further object of the invention is to produce means whereby air or other fluid may be compressed by the action of agitated water as its movement is restricted.

A further object is to accomplish the results above mentioned by mechanism which would prove inexpensive to produce and sustain when compared with its efficiency.

With the above and other objects in view the invention consists in the means whereby the above results are accomplished in a novel manner.

Furthermore, the invention consists in the details of construction as well as in the arrangement and combination of parts to be hereinafter more fully set forth and claimed.

In describing the invention in detail reference will be had to the accompanying drawing, forming part of this specification, wherein like characters of reference denote corresponding parts and in which I have shown my invention by a view in perspective.

In the drawing, 1 denotes the posts, which are anchored in a substantial manner. 2 are staples on the end posts. A float or buoy 3 is arranged between the posts, free to take motion from the waves or swells, which motion it is the purpose of this invention to utilize for performing work.

Pivoted to the float or buoy are arms 4, each pair crossing and being pivoted at 5, with the ends of said arms having guides 6 engaging the staples 2. From the construction shown it will be seen that the arms are similar in operation to lazy-tongs.

Links 7 are connected with the lower ends of the arms and support a tank 8, which is designed to operate similarly to a bellows, a valve $8^a$ being provided for the admission of fluid which is adapted to close as the pressure is brought on the tank. Connected to the tank is a pipe 9 for conveying the fluid to a suitable reservoir or station. (Not shown.)

The parts are so arranged that as the float is elevated the arms are carried up by reason of the position at which they are pivoted. The tank is elevated at a greater speed than the float, so that said tank is caused to press against the under side of the float or buoy, resulting in a pressure which forces the contained fluid of the tank through the pipe 9 to a point where it is utilized. The tank may be composed of any desired flexible material which will withstand the strain, which in a large construction would prove very great, as the pressure obtainable would vary with the size of the float or buoy and the position at which the arms are pivoted, it being understood that the tank may be made to approach the buoy at greater or less speed, as desired.

The construction, operation, and advangages will, it is thought, be understood from the foregoing description, it being noted that changes may be resorted to in the proportions and details of construction without departing from the spirit of my invention.

Having fully described my invention, what I claim as new, and desire to secure by Letters Patent, is—

1. In a device of the character described, a float, arms pivoted thereto, a collapsible tank carried by the arms and so arranged that the tank will be pressed against the float as it is elevated, substantially as described.

2. In a device of the character described, a float, arms pivoted thereto, a collapsible tank connected to the arms, said arms being so arranged that the float in its upward movement, will carry the tank at a greater speed, substantially as described.

3. In a device of the character described, a body adapted to ride on the water, arms connected with the body, and a tank connected with the arms and so arranged that the fluid is pressed therefrom, substantially as described.

In testimony whereof I affix my signature in presence of two witnesses.

AARON A. BROWN.

Witnesses:
F. S. APPLEMAN,
CHAS. S. KNODLE.